United States Patent [19]

Sahagian

[11] Patent Number: 4,765,382

[45] Date of Patent: Aug. 23, 1988

[54] REINFORCED RESILIENT WHEEL

[76] Inventor: Edward H. Sahagian, 67 Chester St., Arlington, Mass. 02174

[21] Appl. No.: 75,132

[22] Filed: Jul. 20, 1987

[51] Int. Cl.[4] .......................... B60B 9/12; B60B 17/00
[52] U.S. Cl. ...................................... 152/48; 152/41; 152/49; 152/57; 295/11
[58] Field of Search ...................... 152/41, 49, 30, 56, 152/57, 58, 59, 48; 295/11

[56] References Cited

U.S. PATENT DOCUMENTS

| 2,891,593 | 6/1959 | Deuring et al. | 152/49 |
| 2,903,036 | 9/1959 | Wolfram | 152/49 |
| 3,090,415 | 5/1963 | Sahagian | 152/41 |
| 3,288,193 | 11/1966 | Mantzel | 152/49 |
| 4,549,590 | 10/1985 | Sahagian | 152/41 |

Primary Examiner—James B. Marbert
Attorney, Agent, or Firm—Hamilton, Brook, Smith & Reynolds

[57] ABSTRACT

A reinforced resilient wheel having a rim (4), a hub (12), a shock absorbing air space (18), formed between a channel (10), and an elastomeric member (16) with flange means (26) clamping the elastomeric member to the rim, and reinforcing means (60, 62) for securing the elastomeric member to the rim.

11 Claims, 4 Drawing Sheets

REINFORCED RESILIENT WHEEL

FIELD OF THE INVENTION

This invention relates to resilient wheels of the type in which an annular resilient shock absorbing element isolates the rim on which the tire is mounted from the central part or hub of the wheel which attaches to the brake drum. The shock absorbing element serves as an absorber of bumps and vibrations imparted to the tire and rim, as for example, from running over an obstacle or into a depression in a road surface.

BACKGROUND OF THE INVENTION

In spite of the enormous advance attained by the modern pneumatic tire in absorbing and suppressing road shocks, a very substantial amount of shock and vibration still is passed on by the tire to the standard metallic rim. The rim being fixed to or integral with the wheel and/or the metallic hub fixed therein, passes on shocks through the springs to the body. Lower tire pressures and softer springing have reduced the amount of shock and vibration thus transmitted, but these resorts bring other well known drawbacks in their turn, e.g., reduced handling precision.

An example of prior art resilient wheels includes U.S. Pat. No. 2,891,593 to Deuring et al. It discloses a wheel having two rubber shock absorbing rings vulcanized to a divided rim, one ring to a supporting disc attached to the main wheel disc or hub, the other to an annular flange secured to the disc and diverging from the supporter ring. U.S Pat. No. 2,903,036 to Walfram also discloses two rubber rings secured to annular rings bolted to bosses on the wheel hub and secured to the outer tire rim.

In both of these patents the rubber shock absorbing rings are exposed directly to ambient air pressure on both their sides relying completely on their own resilience to absorb shocks.

In my prior U.S. Pat. No. 3,090,415, I disclosed a pneumatic tired vehicle wheel in which the rim was separated from the hub by a single band of rubber or other elastomeric material which isolated the hub from shock imparted to the tire and rim. In accordance with the invention, the rim is separated from all metallic contact with the wheel and/or hub of the vehicle by suspending the wheel within the rim in a continuous band of elastomeric material bonded to the rim along its lateral margins. The elastomeric material is also bonded to extensions or "spokes" on the wheel in alignment with apertures provided in the otherwise continuous felloe of the rim. The elastomeric material is subjected at such apertures to the air pressure within the tires, directly in the case of tubeless tires and through the intervening tube when such is used, so that the elastomeric material is stressed when the tire was inflated, imparting stability to the assembly.

To overcome this difficulty I developed an improved resilient wheel forming the subject matter of U.S. Pat. No. 4,549,590 in which there is a central hub with a shock absorbing member between the rim and the central hub. It comprises an annular, pneumatically sealed, hollow, substantially toroidal member, at least a portion of which is flexible. Both the rim and the hub are attached to the toroidal member, one of which is attached to the flexible portion whereby shocks imparted to the rim are absorbed by the flexible portion and the air within the toroidal member.

It is possible that the resilient wheel disclosed in my U.S. Pat. No. 4,549,590 might be susceptible to the shock absorbing member coming disengaged from either the annular, substantially toroidal, member surrounding the central hub or a cup-like annular channel to which it is sealed.

Accordingly, it is an object of the present invention to provide a resilient wheel having a rim, a hub, and an annular channel of substantially u-shaped cross-section secured to the hub with an annular elastomeric member enclosing the channel. It is secured, not only by appropriate bonding, but by interlocking mechanism, the geometry of which, assures that it will not be disengaged from the rim or the hub.

SUMMARY OF THE INVENTION

The invention is embodied in a reinforced resilient wheel which has an annular tire rim and a hub located within the rim. There is an annular channel of generally U-shaped cross-section on the inner side of the rim and facing the hub. A one-piece, annular, elastomeric member engages the annular channel creating a shock absorbing, sealed, air space defined by the inner surface of the elastomeric member and the inner surface of the U-shaped channel. The hub is connected to the elastomeric member and there are flange means attached to the rim which extend around the edges of the elastomeric member to clamp the member to the rim.

In one form of the invention the annular flanges are permanently secured to the rim adjacent the sealed air space with each flange having at least one leg extending around the edges of the elastomeric member in engagement therewith to clamp the member to the rim.

In accordance with another feature of the invention, there is an annular reinforcing member in the form of a hoop on the elastomeric member in the air space and mechanical fastener means are employed to connect the hoop to the hub.

Another feature of the invention resides in the flange means being constructed to extend toward the hub from opposed directions and terminate without engaging the hub to create a limiting means to restrict lateral deflection of the rim and tire relative to the hub.

The above and other features of the invention including various novel details of construction in combinations of parts will now be more particularly described with reference to the accompanying drawings and pointed out in the claims. It will be understood that the particular reinforced resilient wheel embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
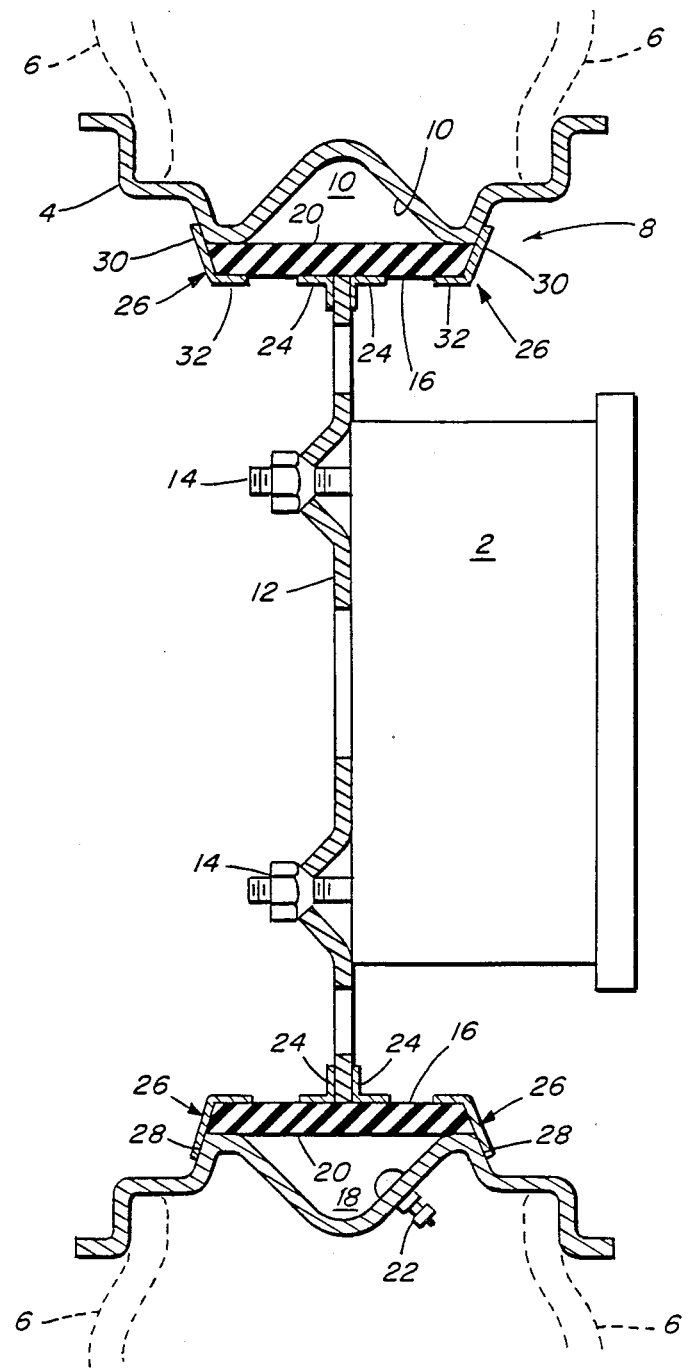
FIG. 1 is a sectional view of a portion of a wheel in which there is an annular, elastomeric shock absorbing member secured to the rim of a wheel by flange means embodying features of the present invention.

Referring to FIG. 1 there will be seen a wheel having a brake drum 2, a tire rim generally indicated 4, and the bead portion 6 of a tire mounted on the rim. A shock absorbing member generally indicated 8 includes a portion 10 of the rim in the form of an annular channel which is generally "U" or "V" shaped in cross-section and is located on the inner side of the rim 4. It faces a hub 12 which is secured by nuts and bolts 14 to the main wheel body including the brake drum.

Figure 2:
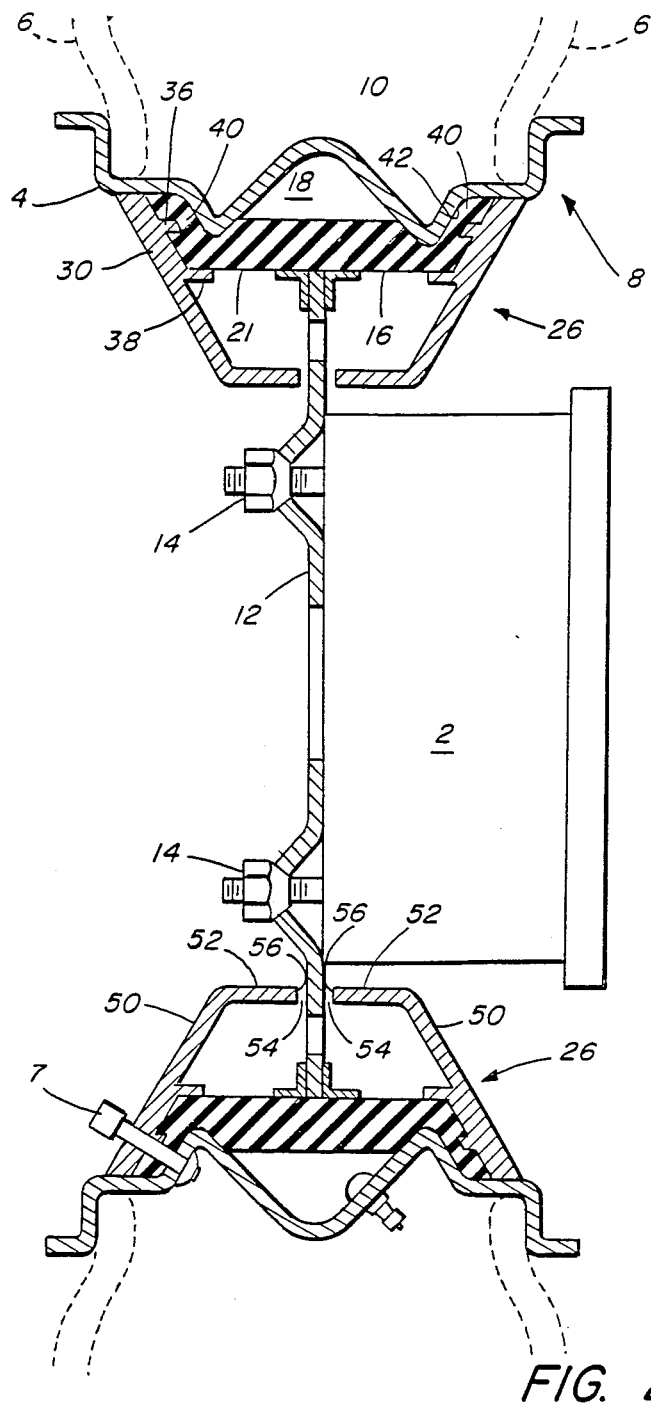
FIG. 2 is a view similar to FIG. 1 of an alternative embodiment of the invention.
Figure 3:
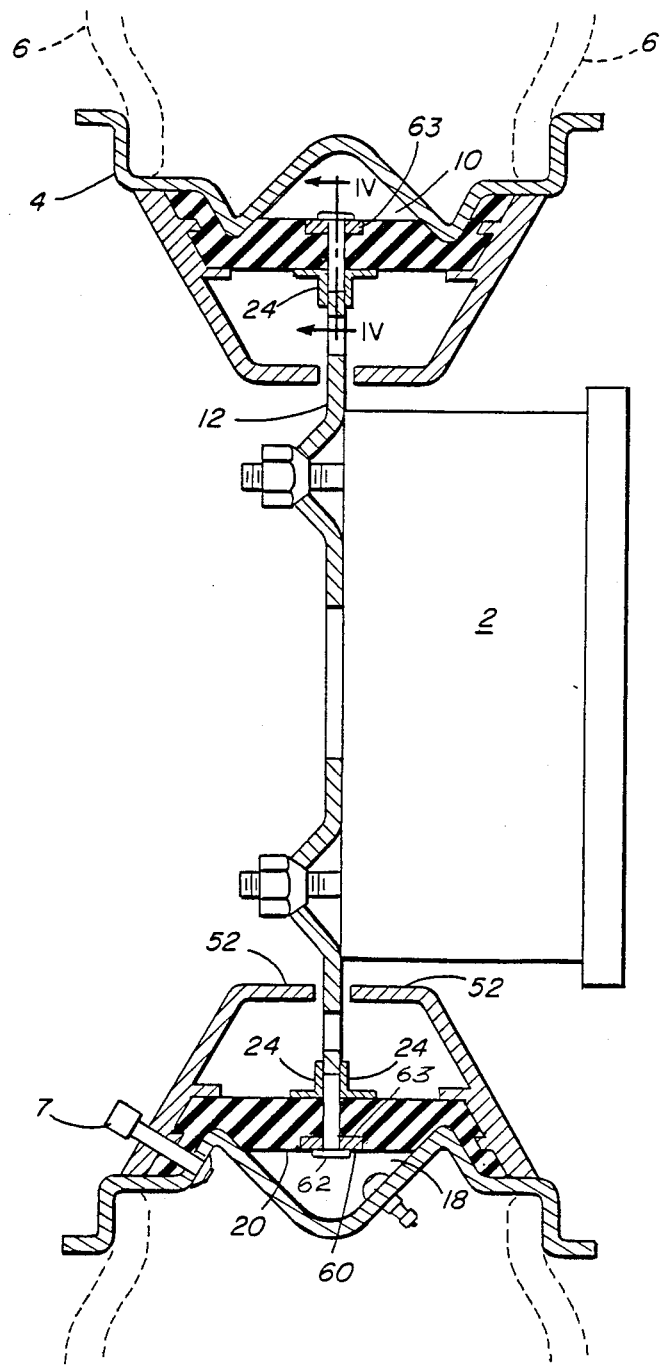
FIG. 3 is a view similar to FIG. 1 showing an additional feature of the invention.

A one-piece, annular, elastomeric member 16 engages the annular channel 10 and is bonded thereto. The elastomeric member may be any appropriate elastomeric material such as rubber, butyl or the like. An annular chamber 18 is thus created between the inner side of the rim 10 and the inner side 20 of the elastomeric member which faces the rim. Thus, there is a substantially toroidal air cushion which may be inflated through a valve stem 22 prior to the inflation of the tire 6 through its stem 7 (FIGS. 2 & 3).

The elastomeric member 16 as disclosed in my prior patents may be bonded to the rim 12 by appropriate bonding means such as vulcanizing, for example. In addition, it is secured by annular flange members 24 which as seen in FIG. 1 are substantially L-shaped in cross-section. These flanges may be welded or otherwise secured to the hub 12 and bonded to the elastomeric member 16.

To further secure the elastomeric member in position, flange means in the form of annular members 26 are secured at 28 to the rim by welding or the like, and extend around the edges of the elastomeric member to clamp the member to the rim. It will be seen that these flange means are generally L-shaped in cross-section but not necessarily formed with a right angle. They have a first leg 30 secured to the rim and a second connected leg 32 wrapped around and engaged with the elastomeric member to clamp it firmly against the rim. In the areas where the elastomeric member 16 engages the rim and the flange means 26, their mating surfaces can be secured by appropriate bonding such as vulcanization or cementing.

Thus, there is an annular shock absorbing chamber between the tire rim 4 and the hub 12 formed by the tire rim and the elastomeric member 16. The member 16 is firmly and securely bonded to both the rim and the hub.

Referring next to FIG. 2, the flange means 26 will be seen to include a larger, heavier member than disclosed in FIG. 1. The leg 30 includes one inwardly inclined, annular leg or projection 36 and a second inwardly inclined projection 38. With this construction the elastomeric member 16 includes a pair of flange portions 40 which extend between the blank 30 and a wall portion 42 of the rim 4. The projecting member 36 will be seen entering the elastomeric member. The parallel projection 38 is engagable with the surface 21 of the elastomeric member which faces away from the chamber 18. This configuration provides for additional strengthening of the elastomeric member and assures greater clamping pressure to the rim.

As will be seen and described with reference to the bottom portion of FIG. 2, each of the flange members 26 has at least one leg portion 50 which extends toward the hub and includes inwardly projecting portions 52 which extend toward the hub 4 from opposite directions. They terminate without engaging the hub leaving a space 54 between their ends 56 and the hub. The ends of the portions 52 create limiting means to restrict lateral deflection of the rim and tire relative to the hub.

Referring next to FIG. 3, the elastomeric member 16 may be reinforced by a steel ring or hoop 60 in the same manner as disclosed in my U.S. Pat. No. 4,549,590. The ring or hoop 60 is located on the inner face 20 of the elastomeric member. It is preferably set into a recess in the elastomeric material. The hoop 60 may be bonded to the elastomeric material by vulcanization.

Figure 4:
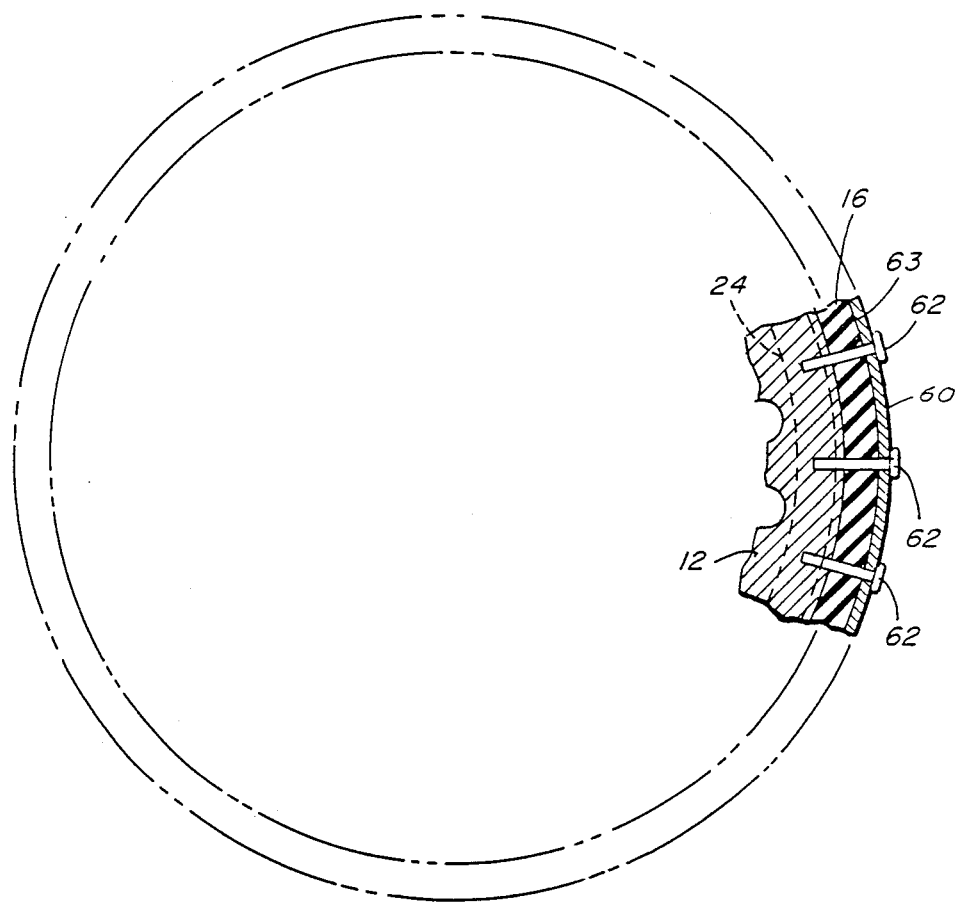
FIG. 4 is a sectional view taken on the lines IV—IV of FIG. 3.

As seen in FIG. 4 a plurality of mechanical fastener means in the form of beaded rivets 62 pass through the hoop or ring 60 and the elastomeric member 16 to hold the hoop either at the outside of or in a channel 63 formed in the elastomeric member 16. The fastener means are secured at their ends to the periphery of the hub 12, as for example, by welding. In like manner the mechanical fastener means may be threaded into the periphery of the hub 12. This provides for a more secure attachment of the hub to the elastomeric member 16.

I claim:

1. A reinforced resilient wheel having:
    an annular tire rim,
    a hub within the rim,
    an annular channel of generally U-shaped cross-section on the inner side of the rim and facing the hub,
    a one-piece, annular, elastomeric member engaging the annular channel creating a shock absorbing, sealed, air space defined by the inner surface of the elastomeric member and the inner surface of the U-shaped channel,
    the hub being connected to the elastomeric member by mechanical fastening means comprising headed fasteners passing through the elastomeric member and secured to the hub, and
    flange means attached to the rim extending around the edges of the elastomeric member to clamp the member to the rim.

2. A reinforced resilient wheel in accordance with claim 1 wherein, there is an annular reinforcing member in the form of a hoop on the elastomeric member in the air space and mechanical fastener means connecting the hoop to the hub.

3. A reinforced resilient wheel in accordance with claim 1 wherein, the securing means include at least two legs each extending in engagement with the elastomeric member to clamp the member to the hub.

4. A reinforced resilient wheel in accordance with claim 1 wherein the flange means extend toward the hub from opposed directions and terminate without engaging the hub to create a limiting means to restrict lateral deflection of the rim and tire relative to the hub.

5. A reinforced resilient wheel having:
    an annular tire rim,
    a hub within the rim,
    an annular channel of generally U-shaped cross-section on the inner side of the rim and facing the hub,
    a one-piece, annular, elastomeric member engaging the annular channel creating a shock absorbing, sealed, air space defined by the inner surface of the elastomeric member and the inner surface of the U-shaped channel,
    the hub being connected to the elastomeric member by mechanical fastening means comprising headed fasteners passing through the elastomeric member and secured to the hub, and
    means for securing the elastomeric member to the rim comprising a pair of an annular flanges permanently secured to the rim adjacent the sealed air space, each flange having at least one leg extending around the edges of the elastomeric member in engagement therewith to clamp the member to the rim.

6. A reinforced resilient wheel in accordance with claim 5 wherein, there is an annular reinforcing member in the form of a hoop on the elastomeric member in the air space and mechanical fastener means connecting the hoop to the hub.

7. A reinforced resilient wheel in accordance with claim 5 wherein, the securing means include at least two legs each extending in engagement with the elastomeric member to clamp the member to the hub.

8. A reinforced resilient wheel in accordance with claim 5 wherein the flange means extend toward the hub from opposed directions and terminate without engaging the hub to create a limiting means to restrict lateral deflection of the rim and tire relative to the hub.

9. A reinforced resilient wheel having:
an annular tire rim,
a hub within the rim,
an annular channel of generally U-shaped cross-section on the inner side of the rim and facing the hub,
a one-piece, annular, elastomeric member engaging the annular channel creating a shock absorbing, sealed, air space defined by the inner surface of the elastomeric member and the inner surface of the U-shaped channel,
the hub being connected to the elastomeric member by mechanical fastening means comprising headed fasteners passing through the elastomeric member and secured to the hub, and
flange means attached to the rim extending around the edges of the elastomeric member to clamp the member to the rim,
an annular reinforcing member in the form of a hoop on the elastomeric member in the air space and mechanical fastener means connecting the hoop to the hub.

10. A reinforced resilient wheel in accordance with claim 9 wherein, the securing means include at least two legs each extending in engagement with the elastomeric member to clamp the member to the hub.

11. A reinforced resilient wheel in accordance with claim 9 wherein the flange means extend toward the hub from opposed directions and terminate without engaging the hub to create a limiting means to restrict lateral deflection of the rim and tire relative to the hub.

* * * * *